United States Patent
Yearous et al.

(10) Patent No.: US 6,371,290 B1
(45) Date of Patent: Apr. 16, 2002

(54) PACKAGE FOR ATHLETIC GLOVE

(75) Inventors: Jeffrey Blaine Yearous, Carlsbad; Philippe Besnard, Oceanside, both of CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 0 days.

(21) Appl. No.: 09/376,548

(22) Filed: Aug. 18, 1999

(51) Int. Cl.⁷ .............................................. B65D 85/20
(52) U.S. Cl. ..................... 206/315.1; 206/278; 206/806
(58) Field of Search ................................. 206/278, 806, 206/815, 232, 315.1, 776, 438, 777, 778; 220/4.22, 4.23, 367.1, 662, 602; 40/324; 223/78

(56) References Cited

U.S. PATENT DOCUMENTS

| | | | | |
|---|---|---|---|---|
| 1,916,994 A | * | 7/1933 | Siegrist | 206/776 |
| 2,581,099 A | * | 1/1952 | Guffey | 206/776 |
| 4,061,170 A | * | 12/1977 | Marks | 206/278 |
| 4,269,347 A | * | 5/1981 | Cavan, Jr. | 206/776 |
| 4,418,849 A | * | 12/1983 | Santa | 206/278 |
| 4,565,287 A | * | 1/1986 | Rede et al. | 206/278 |
| 4,948,267 A | * | 8/1990 | Kaldenbaugh | 206/278 |
| 5,011,053 A | * | 4/1991 | Davies | 206/278 |
| 5,204,130 A | * | 4/1993 | McDevitt et al. | 206/815 |
| 5,269,430 A | * | 12/1993 | Schlaupitz | 220/4.23 |
| 5,522,499 A | * | 6/1996 | DeBianio et al. | 206/278 |
| 5,642,809 A | * | 7/1997 | Mayville | 206/278 |
| 5,718,336 A | * | 2/1998 | Haarlander | 206/232 |
| 5,899,334 A | * | 5/1999 | Domerchie et al. | 206/470 |
| 5,947,321 A | * | 9/1999 | Vadney | 220/367.1 |

* cited by examiner

*Primary Examiner*—Shian Luong
(74) *Attorney, Agent, or Firm*—John L. Rogitz

(57) ABSTRACT

A reusable package for an athletic glove includes a body made of non-flaccid translucent plastic. The body has two halves joined together along a living hinge, such that the body can be moved between an open configuration, wherein the interior of the package is exposed, and a closed configuration, wherein a glove can be enclosed by the package. To facilitate drying the glove after it is used and then replaced back into the package in a substantially unfolded, relaxed configuration, one of the body halves is formed with vent holes. The other body half is formed with a relatively thinner area that functions as a window, with the remainder of the body half being thicker than the window.

14 Claims, 3 Drawing Sheets

PACKAGE FOR ATHLETIC GLOVE

FIELD OF THE INVENTION

The present invention relates generally to packages for athletic gloves, and more particularly to reusable packages for golf gloves.

BACKGROUND

Athletic gloves such as golf gloves are worn by athletes to improve the athlete's grip on, e.g., a golf club. Ordinarily, athletic gloves are made of leather or a leather-like material. The material, when first purchased, is supple, and indeed the effectiveness of the glove in providing a good grip is thought to be directly dependent on its suppleness. Such gloves are typically sold in flaccid paper-and-plastic packages that ordinarily are discarded immediately after they are opened.

Unfortunately, athletic gloves can quickly lose their suppleness, in large part because the leather material usually is not treated with appropriate care. For example, after even moderate use, perspiration can soak the glove, and many times the athlete will remove the glove when wet and toss it, in a balled configuration, into a storage area, e.g., of a golf bag. The glove then dries in the balled-up configuration. When it is desired to reuse the glove, the glove is unfolded and stretched over the athlete's hand, with repeated cycles of such use rather quickly destroying the suppleness of the glove and, hence, its effectiveness. The present invention has recognized the above-noted problem, and understands that a solution can be provided whereby an athlete is provided with a convenient and effective way to properly store an athletic glove when the glove is not in use.

SUMMARY OF THE INVENTION

A package for an athletic glove includes a non-flaccid plastic body that has a first body element joined to a second body element along a living hinge. Together, the body elements define an interior and an exterior of the body. In accordance with the present invention, the body elements are movable between an open configuration, wherein the interior is exposed, and a closed configuration, wherein the interior is enclosed by the body elements. With this structure, the body is configured for holding at least one athletic glove in a relaxed, preferably substantially unfolded configuration between the body elements. Desirably, at least the first body element is formed with plural vents to establish air communication between the interior and exterior of the body to facilitate drying of the glove.

In a preferred embodiment, a tab projects outwardly from at least one of the body elements. The tab defines an eye for facilitating hanging the package on a support. Also, at least one finger hold projects outwardly from at least one of the body elements to facilitate moving the body elements between the open and closed configurations. More preferably, a first finger hold is made integrally with the first body element and a second finger hold is made integrally with the second body element.

As intended by the preferred embodiment, the body elements have approximately equal sizes. Also, the body elements are made of translucent plastic. The second body element preferably is integrally formed with a relatively thinner window area bounded by a relatively thicker body area.

In another aspect, a device includes at least one athletic glove made of leather, and a package that defines an interior holding the glove in a relaxed configuration. The package is formed with plural holes for ventilating the glove.

In still another aspect, a method for maintaining an athletic glove includes selling the glove in a package made of non-flaccid plastic. The package can be moved between an open configuration and a closed configuration. Accordingly, the package is moved to the open configuration such that the glove can be removed and used. After using the glove, the glove is placed back in the package and the package moved to the closed configuration to enclose the glove. While the package is in the closed configuration with the glove enclosed in the package, the glove dries in a relaxed configuration.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
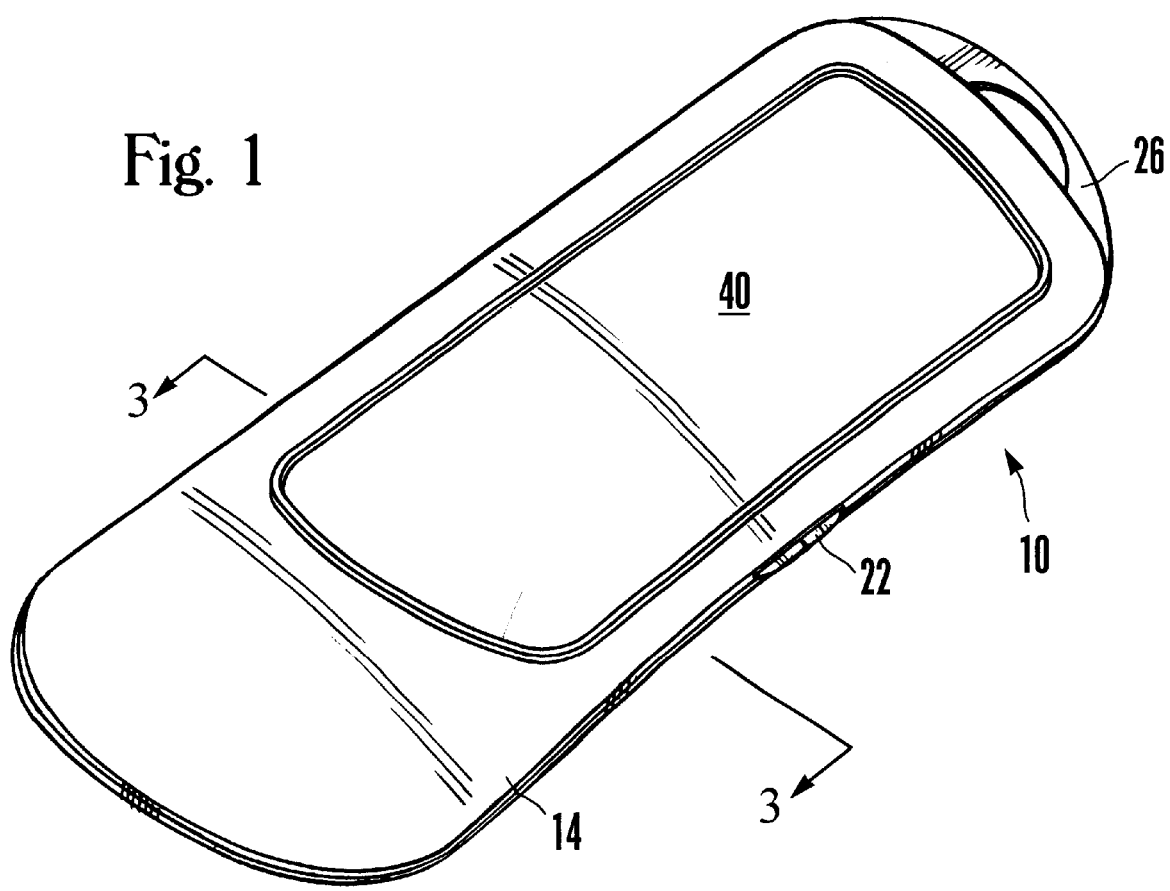
FIG. 1 is a perspective view of the present athletic glove package, in the closed configuration.
Figure 2:
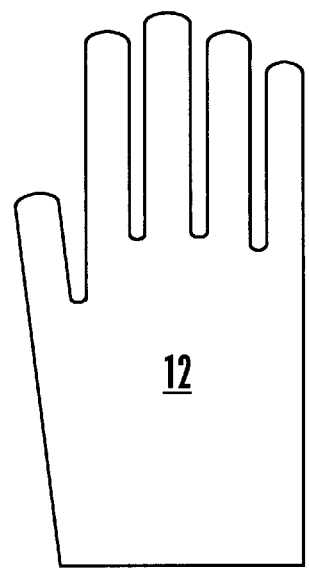
FIG. 2 is a plan view of the package in the open configuration, showing an athletic glove in an exploded relationship with the package.
Figure 2:
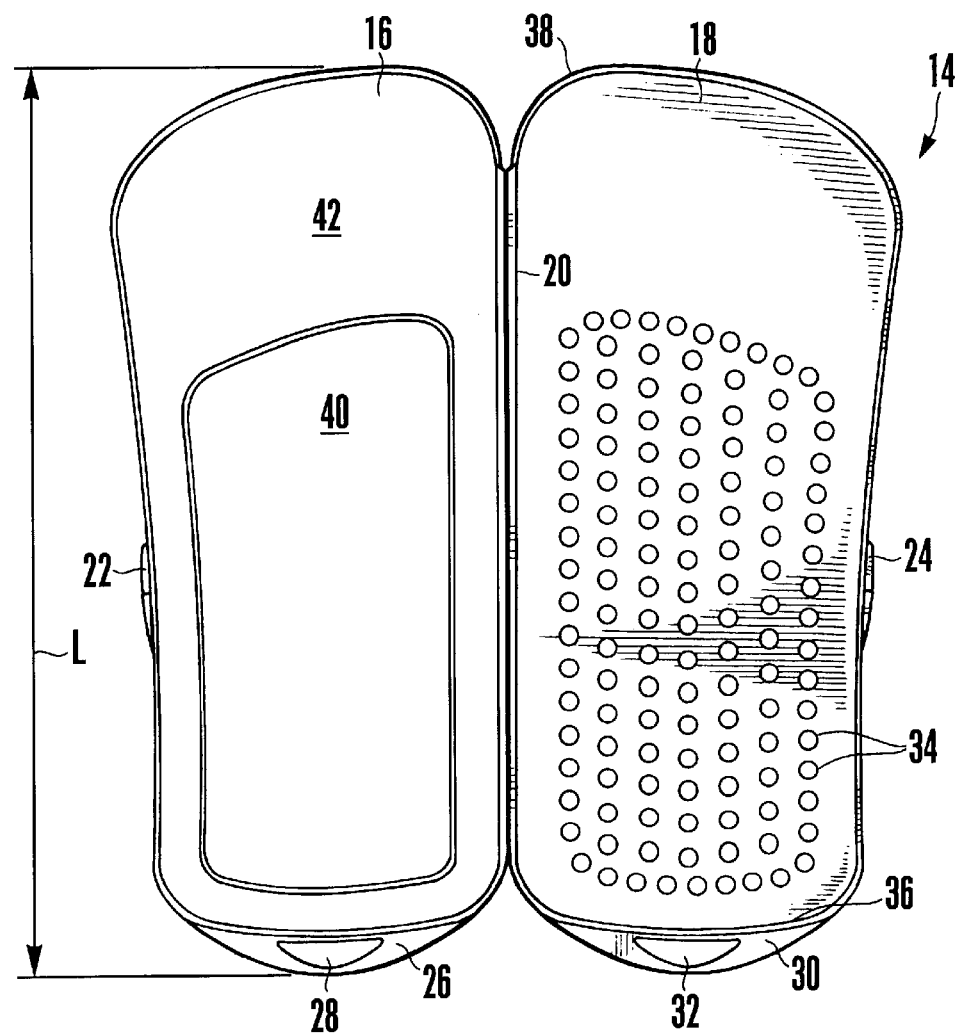

Referring to FIGS. 1 and 2, a reusable package is shown, generally designated 10, for holding an athletic glove 12 in the relaxed, preferably unfolded configuration of the glove 12 shown in FIG. 2, it being understood that in some embodiments the thumb, fingers, or edge of the glove can be folded if desired over the palm of the glove with the palm remaining substantially unfolded and with the entire glove not balled up, i.e., substantially flat. In the preferred embodiment, the package 10 includes a single unitary non-flaccid plastic body 14 that is made of a translucent or indeed transparent plastic material. In a particularly preferred embodiment, the body 14 exhibits contact clarity, i.e., an object contacting the body 14 can be seen clearly through the body 14. The body 14 preferably can be polypropylene.

More particularly, the body 14 includes first and second body elements, more specifically referred to herein as first and second halves 16, 18 because in the preferred embodiment the halves 16, 18 have the same size and shape as each other, and indeed are mirror images of each other except where noted below. In plan view as shown in FIG. 2, each half 16, 18 is somewhat elongated and the periphery of each half has a gently curved contour.

As can be appreciated in cross-reference to FIGS. 1 and 2, the halves 16, 18 are joined along a living hinge 20. Accordingly, the halves can be moved to establish the closed configuration of the body 14 shown in FIG. 1, wherein the glove 12 is enclosed in the body 14. The body 14 is held in the closed configuration by an interference fit or snapping fit between the halves 16, 18, or by other suitable means.

Also, the halves 16, 18 can be moved to the open configuration shown in FIG. 2, wherein the interior of the body 14 is exposed such that the glove 12 can be placed in and removed from the interior of the body 14. To facilitate moving the body 14 between the open and closed configurations, a first flat, generally semi-circular shaped finger hold 22 is made integrally with the first half 16 and protrudes outwardly therefrom, while a second finger hold 24 is made integrally with the second half 18.

In addition, to facilitate hanging the package 10 on a support, a flat tab 26 projects outwardly from the first half 16. The tab 26 defines an eye 28 that can engage the support. If desired, a second tab 30 having an eye 32 can be provided on the second half 18, it being understood that the tabs 26, 30 are mirror images of each other and that the eyes 28, 32 are juxtaposed with each other when the body 14 is in the closed configuration. If desired, one tab 26, 30 can be formed with a key that is raised in relief from the plane defined by the tab 26, 30, and the key can engage a complimentarily-configured keyway in the other tab 30, 26 in an interference fit, to hold the body 14 in the closed configuration.

To permit the glove 12 to dry after use once it has been enclosed in the body 14, one or both of the halves 16, 18 are formed with plural vent holes. In one preferred embodiment, the second half 18 is formed with plural rows of vent holes 34, with the pattern of holes 34 extending from near a bottom edge 36 of the second half 18 to just beyond halfway to a top edge 38 as shown. This area corresponds to the palm of the glove 12 when the glove 12 is disposed in the body 14 in the intended orientation shown in FIG. 2. It will be appreciated that the vent holes 34 establish air communication between the interior and exterior of the body 14. Alternatively, the vent hole pattern can extend the entire length of the body 14.

Additionally, the first body half 16 can be formed with a relatively thinner window area 40 that is bounded by a relatively thicker body area 42. The thinner window area 40 preferably is flush with the outer surface of the thicker body area 42 and is about one-half the thickness of the thicker body area. Accordingly, the window area 40 establishes a transparent window through which the glove 12 can be easily seen. If desired, the entire exterior of the package 10 can be etched to increase the light dispersion properties, and the interior of the package can be etched on the window side of the mold only to further disperse light on non-window surfaces and thus increase the contrast of clarity between the window area 40 and the remainder of the package 10.

It can be readily appreciated in reference to FIG. 2 that the contour of the window area 40 of the first body half 16 can be a mirror image of the contour of the hole 34 pattern in the second body half 18.

In one preferred embodiment, the length "L" of each half 16, 18, including its hanging tab, is two hundred sixty eight and one-half millimeters (268.5 mm). In contrast, in reference to FIG. 3, the width "W" of each half 16, 18 preferably is less than one hundred twenty millimeters (120 mm), and more preferably is no more than one hundred fourteen millimeters (114 mm). The thickness "t" of the body 14 in the closed configuration is ten millimeters (10 mm). We have found that with these preferred dimensions, the body 14 is sized to hold a conventional athletic glove in a relaxed, substantially unfolded configuration, without permitting the glove to move unduly, out of the relaxed configuration shown in FIG. 2.

Figure 3:
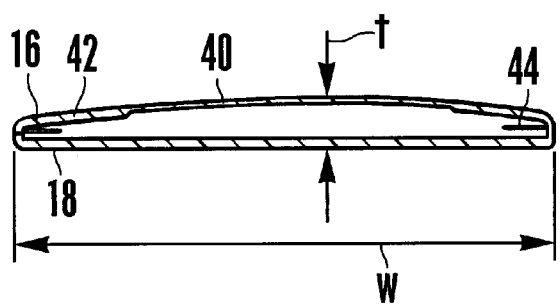
FIG. 3 is an end view of the package as would be seen in cross-section along the line 3—3 in FIG. 1.

Completing the description of FIG. 3, one of the halves 16, 18 (in the embodiment shown, the first half 16) can be gently curved along the dimension shown, i.e., in the width dimension, while the other half can be flat. In any case, the shape and size of the body 14 is marginally larger than the shape and size of a conventional athletic glove in a relaxed configuration. If desired, retention beads 44 can be formed on the body 14 along the left and right edges to retain a printed card or piece of paper between the beads 44 and one of the body halves 16, 18, preferably the second half 18.

It may now be appreciated that the glove 12 can be sold in the package 10, and the package 10 then moved to the open configuration to remove the glove from the package to use the glove. After using the glove, the glove can be placed back into the package 10, and the package 10 then moved to the closed configuration to enclose the glove 12. While the package 10 is in the closed configuration with the glove 12 enclosed, the glove 12 can dry in a relaxed configuration, with drying promoted by the vent holes 34.

Figure 4:
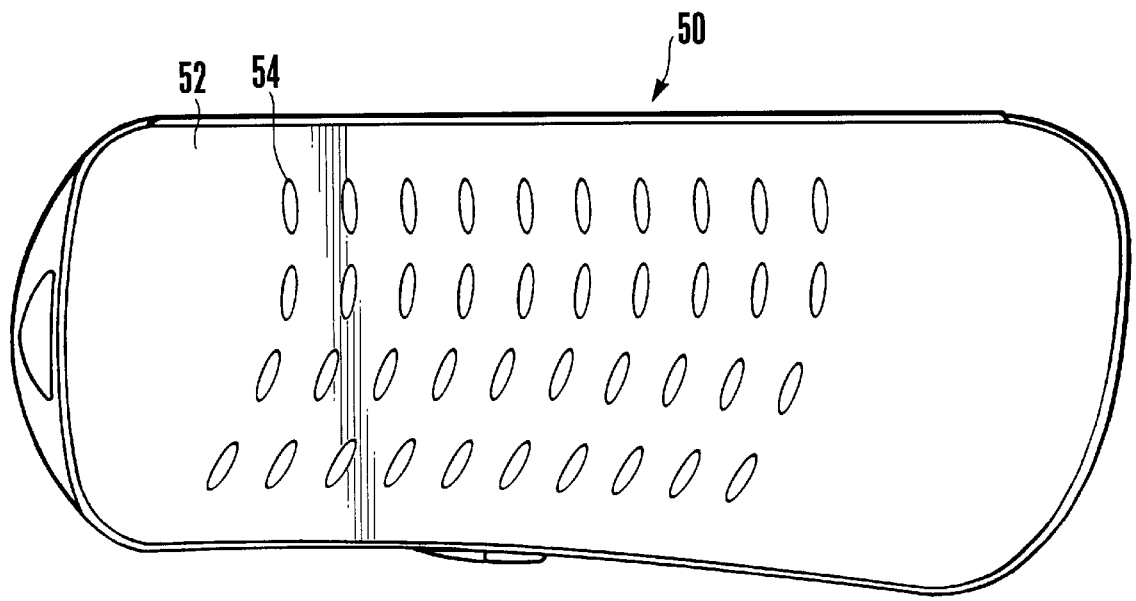
FIG. 4 is a plan view of an alternate package with ovular vent holes.
Figure 5:
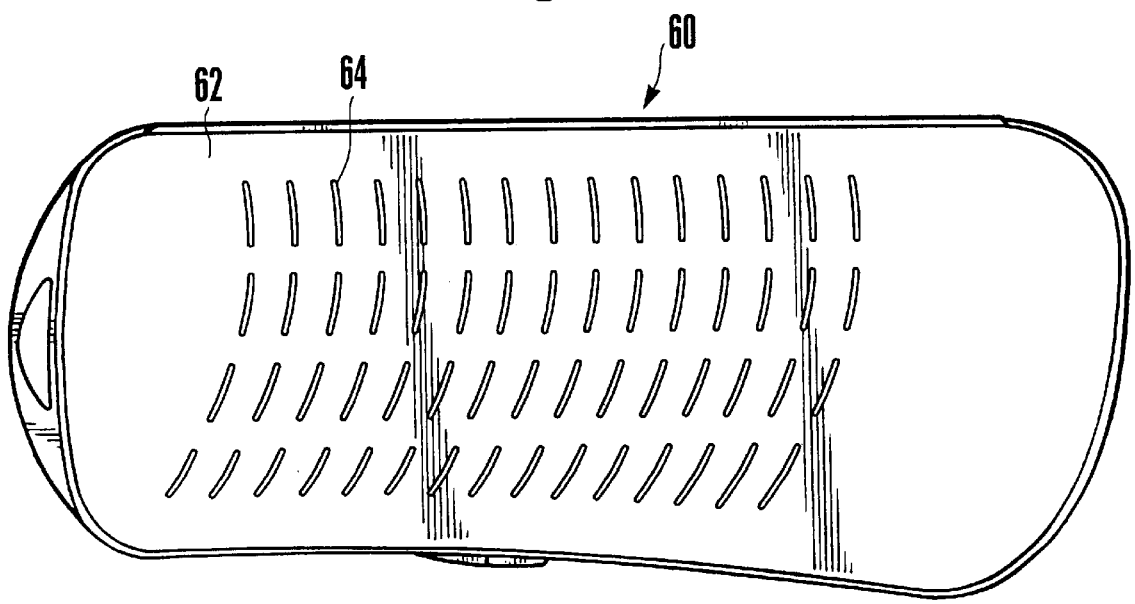
FIG. 5 is a plan view of another alternate package with vent slots.

FIG. 4 shows an alternate package 50 having a body 52 that is in all essential respects identical to the body 14 shown in FIGS. 1–3, with the exception that the body 52 shown in FIG. 4 has ovular-shaped vent holes 54. The holes 54 represent the presently preferred configuration of vent holes. Alternatively, FIG. 5 shows a package 60 having a body 62 that is in all essential respects identical to the body 14 shown in FIGS. 1–3, with the exception that the body 62 shown in FIG. 4 has elongated vent slots 64 that are elongated in the width dimension.

While the particular PACKAGE FOR ATHLETIC GLOVE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A package for an athletic glove, comprising:
   a non-flaccid plastic body including a first body element joined to a second body element along a living hinge, the body elements together defining an interior and an exterior of the body, the body elements being movable between an open configuration, wherein the interior is exposed, and a closed configuration, wherein the interior is enclosed by the body elements, the body being configured for holding at least one athletic glove in a relaxed configuration between the body elements, at least the first body element being formed with plural vents to establish air communication between the interior and exterior of the body, the second body element being integrally formed with a relatively thinner window area bounded by a relatively thicker body area.

2. The package of claim 1, further comprising a tab projecting outwardly from at least one of the body elements, the tab defining an eye for facilitating hanging the package on a support.

3. The package of claim 1, further comprising at least one finger hold projecting outwardly from at least one of the body elements to facilitate moving the body elements between the open and closed configurations.

4. The package of claim 3, wherein the finger hold is a first finger hold made integrally with the first body element and the package further includes a second finger hold made integrally with the second body element.

5. The package of claim 1, wherein the body elements have approximately equal sizes.

6. The package of claim 1, wherein the body elements are made of translucent or transparent plastic.

7. The package of claim 1, wherein the window area defines an outer surface and the body area defines an outer surface, and the outer surface of the window area is flush with the outer surface of the body are.

8. The package of claim 1, wherein the body elements define a maximum width of less than one hundred twenty millimeters (120 mm).

9. The package of claim 8, wherein the body elements define a maximum width of no more than one hundred fourteen millimeters (114 mm).

10. The package of claim 1, further comprising at least one athletic glove disposed in the interior.

11. The package of claim 1, further comprising retention beads formed on the body to retain a printed card or piece of paper between the beads and one of the body elements.

12. A device comprising: at least one athletic glove made of leather; a package defining an interior holding the glove in a relaxed configuration, the package being formed with plural holes for ventilating the glove, the package including a plastic body including a first body element joined to a second body element; and a first finger hold made integrally with the first body element and a second finer hold made integrally with the second body element, the body elements are non-flaccid and are joined together along a living hinge, the body defining an interior and an exterior, the body elements being movable between an open configuration, wherein the interior is exposed, and a closed configuration, wherein the interior is enclosed by the body elements, at least the first body element being formed with the holes, wherein the second body element is integrally formed with a relatively thinner window area bounded by a relatively thicker body area.

13. A method for maintaining an athletic glove, comprising the acts of:

providing the glove in a package made of non-flaccid plastic defining a body, the package being movable between an open configuration and a closed configuration;

moving the package to the open configuration; then removing the glove from the package to use the glove;

after using the glove, disposing the glove in the package;

moving the package to the closed configuration to enclose the glove;

while the package is in the closed configuration with the glove enclosed in the package, permitting the glove to dry in a relaxed configuration; and providing at least one relatively thinner portion of the body and a relatively thicker portion of the body the thinner portion defining a window through which the glove can be viewed.

14. The method of claim 13, wherein the act of permitting the glove to dry is facilitated by forming vents in the package.

* * * * *